US012327577B2

(12) United States Patent
Hall

(10) Patent No.: US 12,327,577 B2
(45) Date of Patent: Jun. 10, 2025

(54) DATA STORAGE DEVICE WITH FLEXIBLE LOGICAL TRACKS AND RADIUS-INDEPENDENT DATA RATE

(71) Applicant: WESTERN DIGITAL TECHNOLOGIES, INC., San Jose, CA (US)

(72) Inventor: David R. Hall, Rochester, MN (US)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 0 days.

(21) Appl. No.: 18/516,164

(22) Filed: Nov. 21, 2023

(65) Prior Publication Data
US 2024/0087601 A1 Mar. 14, 2024

Related U.S. Application Data

(63) Continuation of application No. 17/855,660, filed on Jun. 30, 2022, now Pat. No. 11,862,211.

(51) Int. Cl.
G11B 20/12 (2006.01)
G11B 5/09 (2006.01)
(Continued)

(52) U.S. Cl.
CPC .............. G11B 5/5526 (2013.01); G11B 5/09 (2013.01); G11B 5/4813 (2013.01)

(58) Field of Classification Search
CPC ....... G11B 5/5526; G11B 5/09; G11B 5/4823; G11B 5/4813; G11B 5/54; G11B 20/12;
(Continued)

(56) References Cited

U.S. PATENT DOCUMENTS 4,858,034 A 8/1989 Hassel et al.
5,293,282 A 3/1994 Squires et al.
(Continued)

OTHER PUBLICATIONS

Abraham Silberschatz et al.; Mass-Storage Structure; https://www.cs.uic.edu/~jbell/CourseNotes/OperatingSystems/10_MassStorage.html; "Operating System Concepts, Ninth Edition", Chapter 10; Dec. 7, 2012; 17 pages.
(Continued)

Primary Examiner — Nabil Z Hindi
(74) Attorney, Agent, or Firm — Calderon Safran & Wright P.C.

(57) ABSTRACT

Various illustrative aspects are directed to a data storage device, comprising one or more disks; at least one actuator mechanism configured to position at least a first head proximate to a first disk surface and a second head proximate to a second disk surface; and one or more processing devices. The one or more processing devices are configured to: assign logical tracks to physical tracks of the disk surfaces such that a respective logical track comprises: at least a portion of sectors of a primary physical track, the primary physical track being on the first disk surface; and at least a portion of sectors of a donor physical track, the donor physical track being on the second disk surface. The one or more processing devices are configured to perform, using the first head and the second head, a data access operation with at least one of the logical tracks.

18 Claims, 6 Drawing Sheets

(51) Int. Cl.
  *G11B 5/48* (2006.01)
  *G11B 5/55* (2006.01)
(58) Field of Classification Search
  CPC ............ G11B 5/59633; G11B 20/1205; G11B 20/1209; G11B 5/0275
  USPC .......................................................... 360/48
  See application file for complete search history.

(56) References Cited

U.S. PATENT DOCUMENTS

| | | | |
|---|---|---|---|
| 5,805,386 A | 9/1998 | Faris | |
| 5,873,125 A | 2/1999 | Kawamoto | |
| 6,483,659 B1 | 11/2002 | Kobayashi et al. | |
| 6,484,234 B1 | 11/2002 | Kedem | |
| 6,658,201 B1 | 12/2003 | Rebalski | |
| 6,690,538 B1 | 2/2004 | Saito et al. | |
| 6,952,322 B1 | 10/2005 | Codilian et al. | |
| 7,133,233 B1 | 11/2006 | Ray et al. | |
| 7,436,610 B1 | 10/2008 | Thelin | |
| 7,760,463 B2 | 7/2010 | Ward et al. | |
| 8,447,742 B2 * | 5/2013 | Kobara | G06F 3/0683 707/693 |
| 9,129,630 B1 | 9/2015 | Chang et al. | |
| 9,361,919 B1 | 6/2016 | Lieu et al. | |
| 9,792,938 B1 | 10/2017 | Kobayashi et al. | |
| 10,180,810 B2 * | 1/2019 | Koishi | G11C 16/10 |
| 10,366,726 B1 * | 7/2019 | Granz | G11B 25/043 |
| 10,431,246 B2 | 10/2019 | Zhu et al. | |
| 10,482,911 B1 | 11/2019 | Nanjunda Swamy | |
| 10,783,911 B1 | 9/2020 | Tsai et al. | |
| 10,867,629 B1 | 12/2020 | Kiyonaga et al. | |
| 10,872,629 B2 | 12/2020 | Hall | |
| 2002/0167752 A1 | 11/2002 | DuLaney et al. | |
| 2003/0051110 A1 | 3/2003 | Gaspard et al. | |
| 2005/0078566 A1 | 4/2005 | Wilson et al. | |
| 2005/0138265 A1 | 6/2005 | Nguyen et al. | |
| 2021/0034542 A1 | 2/2021 | Liu et al. | |

OTHER PUBLICATIONS

Yu-wei Lin; Benchmarked Hard Disk Drive Performance Characterization and Optimization Based on Design of Experiments Techniques; A Thesis presented to the Faculty of California Polytechnic State University; Jun. 2010; 82 pages https://digitalcommons.calpoly.edu/cgi/viewcontent.cgi?referer=&httpsredir=1&article=1367&context=theses.

Hard Disk Drive Basics; https://www.ntfs.com/hard-disk-basics.htm; LSoft Technologies Inc.; Apr. 2003; 3 pages.

\* cited by examiner

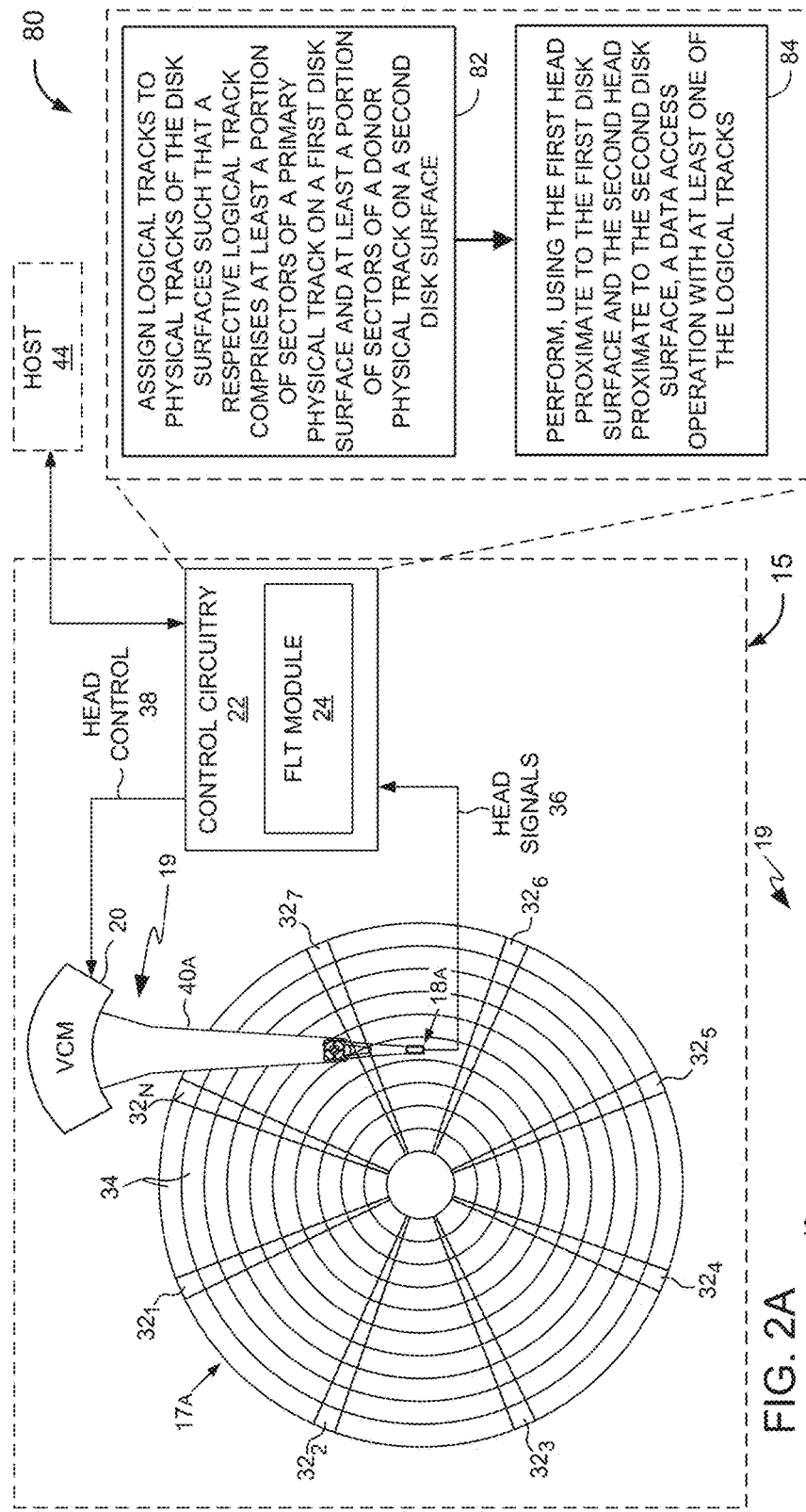
FIG. 2A
FIG. 2C
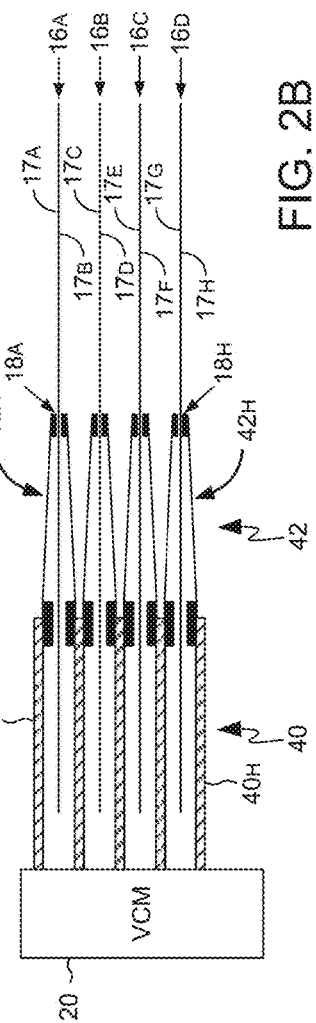
FIG. 2B

DATA STORAGE DEVICE WITH FLEXIBLE LOGICAL TRACKS AND RADIUS-INDEPENDENT DATA RATE

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge 61 comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine actuators, in some examples.

Disk drives may write and read data to and from tracks on disk surfaces through and input/output (I/O) channel between disk drive circuitry and the disk surfaces. A disk drive formats and transmits data to be written to the disk drive surfaces in a track-based format, and reads and decodes data from the data tracks written to the disk surfaces.

SUMMARY

Various examples disclosed herein provide data storage devices such as hard disk drives with control circuitry that may write and read data to and from disk surfaces in logical tracks, or logically defined tracks, that are logically abstracted from the physical tracks, and that extend over extra fractions of physical tracks beyond a primary physical track. The extra fractional physical tracks thus used may be on an opposing disk surfaces of the same disk as the primary tracks, or any other disk surface in the disk drive. The extra fractional physical tracks thus used may be considered donor tracks or auxiliary tracks, which donate fractions of their logic blocks (blocks mapped onto their physical tracks) to a logical track centered on the primary physical track. The control circuitry may arrange the logic block addressing (LBA) to support drawing and interleaving the extra logic blocks from a donor or auxiliary track into a same logical track with a primary physical track.

In some examples, the control circuitry may draw increasing numbers of extra logic blocks from the donor track inversely proportionally to decreasing diameter of the disk, in compensation of decreasing sectors per track with decreasing track diameter between the outer and inner diameters of a disk. Thus, this scheme of implementing selected numbers of sectors per logical track may be independent of the numbers of sectors per physical track, in various examples, and may maintain a constant number of sectors per revolution and per logical track across portions of track radii, or otherwise flexibly enable assigning any advantageous number of sectors per revolution and per logical track across portions of track radii, in various examples.

In conventional disk drives, the decreasing numbers of sectors per track with decreasing track diameter causes I/O data rate to be proportional to track diameter, such that sectors per revolution per track and I/O data rate are proportionally less at smaller track diameters toward the inner diameter of the disks, and leaving proportionally greater proportions of the I/O channel bandwidth or capacity unused. In contrast, a disk drive according to some examples of the present disclosure may compensate for decreasing sectors per track at decreasing diameters with an increasing participation of donor track logic blocks at decreasing diameters, such that data rate becomes constrained only by the I/O channel bandwidth or capacity, which may remain at selected numbers of sectors, in various examples, including constant numbers of sectors without regard to which tracks at which diameters are being accessed, in some examples. A disk drive of this disclosure may thus fully use the data rate capability of the data I/O channel of the disk drive, and may define the data I/O in a format based around the I/O channel capability, rather than in a format based around the tracks. A disk drive format control technology of this disclosure, which defines and assigns logically abstracted tracks based on primary and donor physical tracks, may be referred to as flexible logical tracks (FLT). The FLT module or portion of the control circuitry may interface the logical tracks in lieu of the physical tracks with other portions of the control circuitry that is conventionally configured to interact with tracks, and perform data access operations (e.g., reads and writes) with the flexible logical tracks, thus gaining the advantages of the logical tracks of the present disclosure, while leveraging pre-existing architecture and firmware for interacting with and processing data configured for writing to and reading from conventional tracks.

In various examples of this disclosure, an FLT disk drive format control module may interface with other conventional control circuitry configured for writing to and reading from tracks, and may surface FLT logical tracks in I/O interactions with the conventional control circuitry, such as a single-I/O-channel system-on-chip (SoC), thereby advantageously leveraging existing hardware and embedded software and its capabilities for writing data to and reading data from disk surface tracks, without surfacing to the conventional control circuitry any effects of the FLT logical tracks incorporating multiple physical tracks. Because only fractions of a donor track are used to pair with any one primary track, a single donor track may be used as a donor track for multiple primary tracks, such that the single donor track donates sectors to each of the corresponding primary tracks. An FLT disk drive may switch primary and donor tracks by head, which may keep the primary and donor tracks physically aligned to be within the range of fine actuators, such as milliactuators and/or microactuators. An FLT disk drive may also alternate heads and tracks that are used as primary heads and tracks and auxiliary or donor heads and tracks for various purposes (where a donor head is a head performing data access operations, e.g., read operations and/or write operations, on a donor track), such as to balance out usage of the heads and tracks over time, and to balance out any long-term usage effects.

In some examples of this disclosure, an FLT disk drive may control milliactuators, microactuators, and/or other auxiliary actuators beyond the primary actuator to assist in maintaining alignment of a donor track head with a physical head. In some examples of this disclosure, an FLT disk drive may combine more than one primary physical track and/or more than one fractional donor physical track into a single logical track, rather than only one primary physical track and only one donor physical track. In some examples of this disclosure, an FLT disk drive may use flexible logical track formatting in combination with extending the data access buffer (or read/write buffer) to a flash memory or any type of solid-state non-volatile memory component and use it as a "super cache" to increase internal queue depth, package queues of small host I/O data transfers into long, sequential disk transfers, and reduce average seek and latency, with synergistic advantages from using super cache in combination with flexible logical track formatting.

Various illustrative aspects are directed to a data storage device, comprising one or more disks; at least one actuator mechanism configured to position at least a first head proximate to a first disk surface among the one or more disks and a second head proximate to a second disk surface among the one or more disks, the second disk surface being different from the first disk surface; and one or more processing devices. The one or more processing devices are configured to: assign one or more logical tracks to physical tracks of two or more of the disk surfaces such that a respective logical track of the logical tracks comprises: at least a portion of sectors of a primary physical track of the physical tracks, the primary physical track being on the first disk surface; and at least a portion of sectors of a donor physical track of the physical tracks, the donor physical track being on the second disk surface. The one or more processing devices are configured to perform, using the first head proximate to the first disk surface and the second head proximate to the second disk surface, a data access operation with at least one of the logical tracks.

Various illustrative aspects are directed to a method comprising assigning, by one or more processing devices, one or more logical tracks to physical tracks of two or more disk surfaces such that a respective logical track of the logical tracks comprises: at least a portion of sectors of a primary physical track of the physical tracks, the primary physical track being on a first disk surface of the disk surfaces; and at least a portion of sectors of a donor physical track of the physical tracks, the donor physical track being on a second disk surface of the disk surfaces, different from the first disk surface. The method further comprises performing, by the one or more processing devices, using a first head proximate to the first disk surface and a second head proximate to the second disk surface, a data access operation with at least one of the logical tracks.

Various illustrative aspects are directed to one or more processing devices comprising means for assigning one or more logical tracks to physical tracks of one or more disk surfaces such that a respective logical track of the logical tracks is assigned to comprise: at least a portion of sectors of at least a primary physical track; and at least a portion of sectors of at least a donor physical track of the physical tracks or sectors of a non-volatile memory storage. The one or more processing devices further comprise means for performing a data access operation with at least one of the logical tracks.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 2A and 2B illustrate conceptual block diagrams of a top view and a side view of a data storage device in the form of a disk drive, in accordance with aspects of the present disclosure.

FIG. 2C depicts a flowchart for an example method that control circuitry of a disk drive may perform or execute in controlling the operations of the disk drive, including for assigning one or more logical tracks to physical tracks of two or more of the disk surfaces such that a respective logical track of the logical tracks comprises: at least a portion of sectors of a primary physical track of the physical tracks, the primary physical track being on the first disk surface; and at least a portion of sectors of a donor physical track of the physical tracks, the donor physical track being on the second disk surface; and performing, using the first head proximate to the first disk surface and the second head proximate to the second disk surface, a data access operation with at least one of the logical tracks, in accordance with aspects of the present disclosure.

FIG. 3 depicts an example FLT format logical sector layout across a first primary physical track and a first donor physical track, as may be assigned by control circuitry and implemented by a disk drive, in accordance with aspects of the present disclosure.

FIG. 4 depicts another FLT format logical sector layout across a second primary physical track and the same donor physical track as in FIG. 3, as may be assigned by control circuitry and implemented by a disk drive, in accordance with aspects of the present disclosure.

FIG. 5 depicts another example FLT format logical sector layout across a primary physical track and a donor physical track, as may be assigned by control circuitry and implemented by a disk drive, in accordance with aspects of the present disclosure.

DETAILED DESCRIPTION

Figure 1:
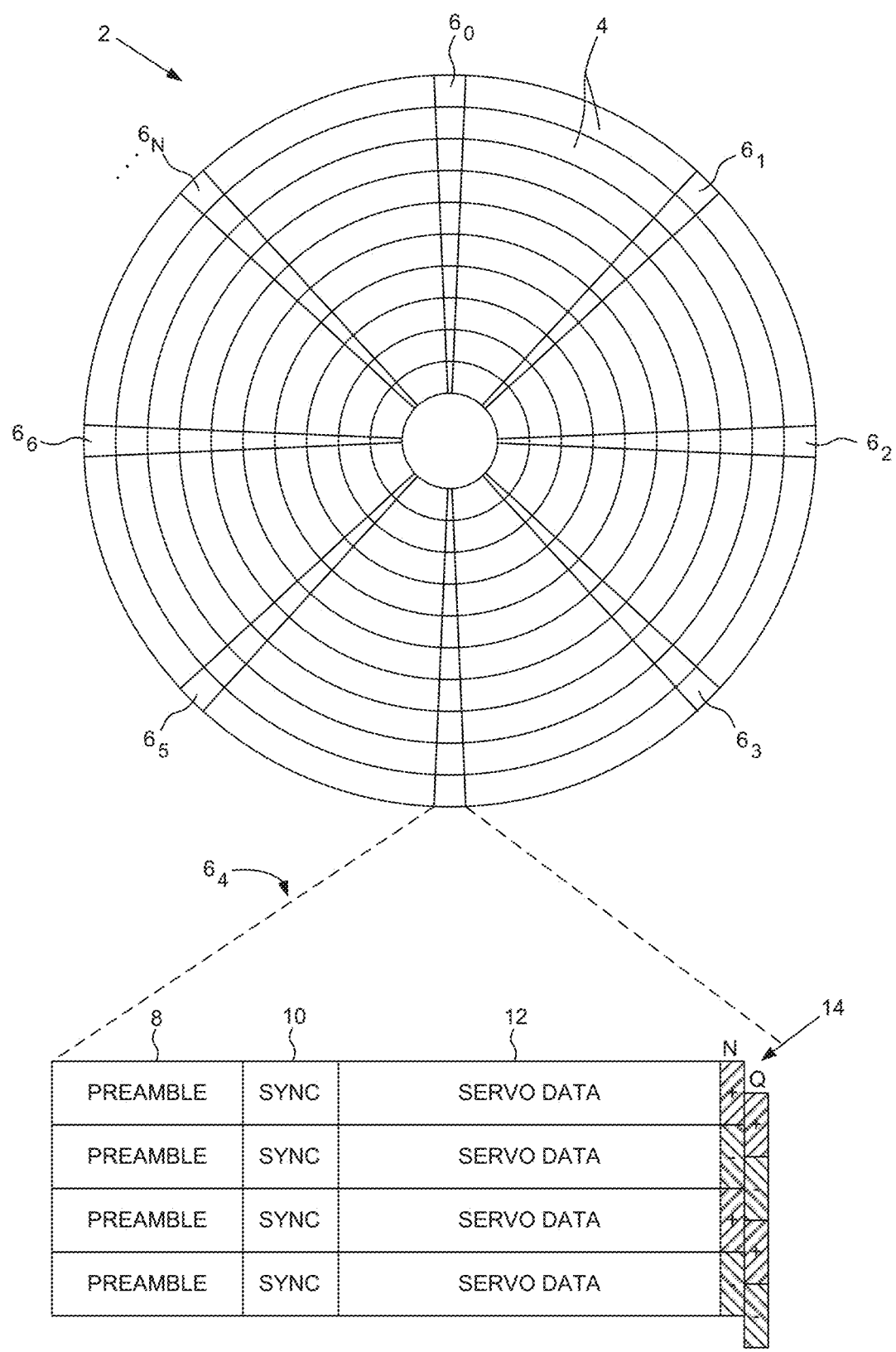
FIG. 1 shows a prior art disk format as comprising a number of radially-spaced, concentric servo tracks defined by servo wedges recorded around the circumference of each servo track.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that control circuitry 22 of disk drive 15 may perform or execute in controlling the operations of disk drive 15, in accordance with aspects of the present disclosure, including operations involved in FIG. 2C depicts a flowchart for an example method that control circuitry of a disk drive may perform or execute in controlling the operations of the disk drive, including for assigning one or more logical tracks to physical tracks of two or more of the disk surfaces such that a respective logical track of the logical tracks comprises: at least a portion of sectors of a primary physical track of the physical tracks, the primary physical track being on the first disk surface; and at least a portion of sectors of a donor physical track of the physical tracks, the donor physical track being on the second disk surface; and performing, using the first head proximate to the first disk surface and the second head proximate to the second disk surface, a data access operation with at least one of the logical tracks, in accordance with aspects of the present disclosure, in accordance with illustrative aspects. Each logical track of the logical tracks is assigned to and comprises at least a primary physical track and at least a portion of an auxiliary or donor physical track, in accordance with aspects of the present disclosure. The logical track may comprise the entirety of the primary physical track, or may comprise at least a portion of the sectors of the primary physical track, in various examples. The terms "auxiliary track" and "donor track" may be used synonymously for purposes of this disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples.

Each of actuator arms 40 is configured to suspend one of read/write heads 18 ("heads 18") in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a greatly simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms, either about a single common coaxial pivot, or about separate pivots, for example, mounted at different circumferential locations about the disks. Various examples may employ more than two actuator arm assemblies or primary actuators or multi-actuators, which may be actuated about a common pivot, or which may be comprised in multiple multi-actuators mounted at different circumferential locations about the disks. In some examples, a disk drive may comprise two or more VCMs stacked vertically together and rotating about a common axis, thereby configured to actuate actuator arms and heads across different disk surfaces independently of each other, from a common pivot axis. Examples in this configuration may be referred to as split actuators or dual actuators. In one example, a disk drive may have two VCMs in a vertical stack, each of which has its own independent actuator arm assembly and controls one half of the actuator arms and heads, with a first half of the actuator arms and heads in a first stack controlled by the first VCM and a second half of the actuator arms and heads in a second stack controlled by the second VCM. Actuator arm assembly 19 and/or any of these other examples may thus constitute and/or comprise an actuator mechanism, in various examples.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In particular, one or more processing devices, such as control circuitry 22, may assign one or more logical tracks to physical tracks of two or more of the disk surfaces such that a respective logical track of the logical tracks comprises: at least a portion of sectors of a primary physical track of the physical tracks, the primary physical track being on the first disk surface; and at least a portion of sectors of a donor physical track of the physical tracks, the donor physical track being on the second disk surface (82). The one or more processing devices, such as control circuitry 22, are further configured to perform, using the first head proximate to the first disk surface and the second head proximate to the second disk surface, a data access operation with at least one of the logical tracks (84). In some examples, control circuitry 22 may assign logical tracks to physical tracks of the disk surfaces such that the logical tracks across at least a portion of track radii of the disk surfaces are assigned with selected numbers of sectors per logical tracks, independent of the numbers of sectors per the physical tracks. Control circuitry 22 may comprise an FLT module 24, which may implement these functions. FLT module 24 may comprise any hardware and/or software and are not limited by any other definitions of the term "module" in any other software or computing context. Control circuitry 22 may further perform additional actions, methods, and techniques, in accordance with various aspects including as further described herein.

Disk drive 15 in accordance with aspects of the present disclosure may also be referred to as an FLT disk drive 15. Disk drive 15 increases the overall hard drive data input/output rate, relative to prior art disk drives. Overall hard drive data input/output rate may also be referred to simply as data rate, for purposes of this disclosure, with the understanding of referring generally to data input/output rate for the disk drive, e.g., between control circuitry 22 and disk surfaces 17, and/or between host 44 and disk surfaces 17. Disk drive 15 may apply substantially the same data rate across at least a substantial portion of disk surfaces 17, and across the tracks thereon at at least a substantial portion of radii of the tracks, as the data rate of an otherwise comparable conventional disk drive at only the outer diameter of disks 16, at the tracks of the largest radii and highest numbers of sectors per track, in various examples of this disclosure. Disk drive 15 may implement logical tracks, based on but distinct from the physical tracks, such that the sectors per logical track are effectively independent of the radii of the physical tracks and of the numbers of sectors per physical track at each radius of disks 16, in various examples of this disclosure.

Disk drive 15 implementing FLT technology of this disclosure may enable higher data rates than conventional disk drives but with a single back-end channel encoder/decoder. Disk drives may implement what may be termed Multi-Band Output (MBO) technology, or multiple integer band, in which a disk drive logically stripes or bundles integer numbers of data tracks together, with multiple heads performing data access operations (e.g., read operations and/or write operations) on multiple tracks together, thus integrating the output of multiple bands (from the multiple tracks via the multiple heads), enabling substantially higher data rates than conventional disk drives. Multiple integer band technology may often be used in association with multiple actuators, in technology that may be referred to as Multiple-Actuator Multi-Band Output (MAMBO) technology. Multiple integer band technology, including MAMBO, may be referred to more generally as multiple integer band technology in this disclosure. FLT technology as described herein is analogously a multiple band technology that may be considered as a superset of multiple integer band technology, which may use at least one integer band of at least one primary track plus fractional portions of at least one donor track as parts of logical tracks. Control circuitry 22 may implement multiple band techniques, processes, and hardware elements, such as fine actuators, to keep all primary physical tracks associated with a single donor track in logical tracks physically closely aligned with each other, with fine control of the respective heads writing and reading those respective physical tracks on the respective disk surfaces, in various examples.

A multiple integer band disk drive also requires multiple back-end channel decoders, which accordingly uses additional power and cost relative to a single back-end channel decoder. A multiple integer band drive may enable two or more heads to work in tandem to perform data access operations (e.g., read operations and/or write operations) in a shared logic block address (LBA) range, and double, triple, or quadruple the data rate of sequential data access, for examples that integrate the operations of two, three, or four heads and tracks, respectively (or otherwise multiplied for examples with more heads in tandem), compared with a conventional disk drive using independent heads.

Disk drive 15 implementing FLT technology of this disclosure may thus, in some examples, be considered as an alternative technology to multiple integer band for increasing data rates, but without requiring multiple back-end channel decoders, in some FLT examples, such as by fitting one integer primary physical track plus one fractional donor track into one logical track. Disk drive 15 implementing FLT technology of this disclosure may implement an independently selected sector density per logical track and a selected (e.g., constant) data rate, maximized up to the maximum channel capability enabled for the maximum radius tracks of the outer diameter, but across a substantial portion of the disk radii, while still also using only a single back-end channel encoder/decoder. Disk drive 15 implementing FLT technology of this disclosure may thus provide substantially higher data rates relative to an otherwise comparable disk drive without FLT technology, and without imposing additional power requirement or cost for additional channel encoders/decoders beyond a single back-end channel encoder/decoder, and a single-channel system-on-chip (SoC).

FLT technology may particularly make use of one or more auxiliary actuators, e.g., milliactuators and/or microactuators, on the actuator arms, to enable compensatory fine control to coordinate fine positioning of multiple heads, in the face of positioning performance constraints such as thermal expansion and tilt, for closely coordinating multiple heads for a single logical track, in some fractional multiple band examples. Some examples using multiple integer primary tracks may require novel changes to servo control and firmware, as well as additional channels. FLT disk drives that are not combined with multiple integer band and that use a single primary track in various examples of this disclosure may enable higher data rates than in otherwise analogous disk drives without imposing any additional changes or costs associated with multiple integer band technology, in various examples. Various examples of FLT-implemented disk drives may thus offer a flexible set of options for performance advantages and trade-offs.

While FLT may be considered an alternative in certain contexts to multiple integer band as a technology for increasing disk drive data rate, in some examples in accordance with this disclosure, a disk drive may also implement both FLT and multiple integer band technologies in combination. While FLT may be used as an alternative to multiple integer band to increase data rates, among other advantages, that is not to contradict the fact that a disk drive in some examples of this disclosure may also use multiple integer band and FLT in combination, which may enable data rates higher than using either of those particular implementations of multiple integer band or FLT alone, and may provide synergistic advantages. Using FLT may enable optimizing power and cost for multiple integer band in a disk drive that combines FLT and multiple integer band, in various examples.

An FLT disk drive of this disclosure may particularly enable higher data rates for larger random read sequential data transfers. Overall data rates depend strongly on different factors depending on the sizes of sequential data transfers. Direct comparisons in overall data transfer times may be made with the same queue depth, e.g., a queue depth of 4. In a relatively small random read data transfer, such as for 4 kilobytes (kB), a large proportion of access time (or inverse of data rate) is due to seek and latency, and may be primarily improved with improvements to seek and latency capability such as multiple actuators, and only a small proportion of access time is occupied by the data transfer. In a relatively larger random read data transfer, such as for 2, 4, or 8 megabytes (MB), for example, the proportions are reversed (though may not be as lopsided between the factors): the data access time for the read data transfer is greater than for the seek and latency, such that a substantial majority of the overall data access time is spent with the head on track, and reading and transferring the data from the disk surface. An FLT disk drive of this disclosure may increase read data transfer speed, relative to an otherwise comparable disk drive without FLT technology, and thus may particularly increase overall data transfer speed for larger data transfers, in which overall data rate speed depends primarily on on-track read transfer rate.

FLT format and data rate, as implemented by control circuitry 22 with disks 16 of this disclosure, are defined by channel capability & LBA layout, not by an integer multiple of physical sectors-per-track (SPT), as in conventional disk drives. In an FLT disk drive 15 of this disclosure (in examples that use a single primary physical track and not multiple primary tracks), control circuitry 22 writes and reads FLT logical tracks to and from disk surfaces 17 such that each FLT logical track corresponds with and is interleaved between one entire physical track, plus a fractional selection or proportion of sectors of a different physical donor track. A single donor track may be associated with multiple primary tracks, and may have donor sectors written to it to correspond as portions of the logical tracks for multiple primary physical tracks. At each track radius, between the inner and outer diameters of disk surfaces 17, FLT control circuitry 22 may draw enough sectors from a donor track to top up the margin of data rate between the primary physical track at that radius and the channel bandwidth.

Thus, FLT control circuitry 22 may interleave an increasingly large proportion of donor track sectors with a primary track at decreasing track radii (toward the inner diameter of the disk), as the sectors per primary physical track continuously decrease proportionally with declining radius. This trend may continue close to the inner diameter of disks 16 such that, at relatively low track radii, a single donor track may have most of its physical sectors assigned to a single primary track. As an example, at close to or at the inner diameter of disks 16, a donor track may have the entirety of its sectors assigned to a single primary track in a single logical track, and there ceases to be a distinction between the primary and donor tracks, but rather, the two physical tracks are both assigned in their entirety to a single logical track, in examples which are limited to a single donor track. In other examples, toward the inner diameter, FLT control circuitry 22 may draw partial sectors from a third track as a donor track for two primary tracks in a single logical track.

Figures 3, 4, 5:
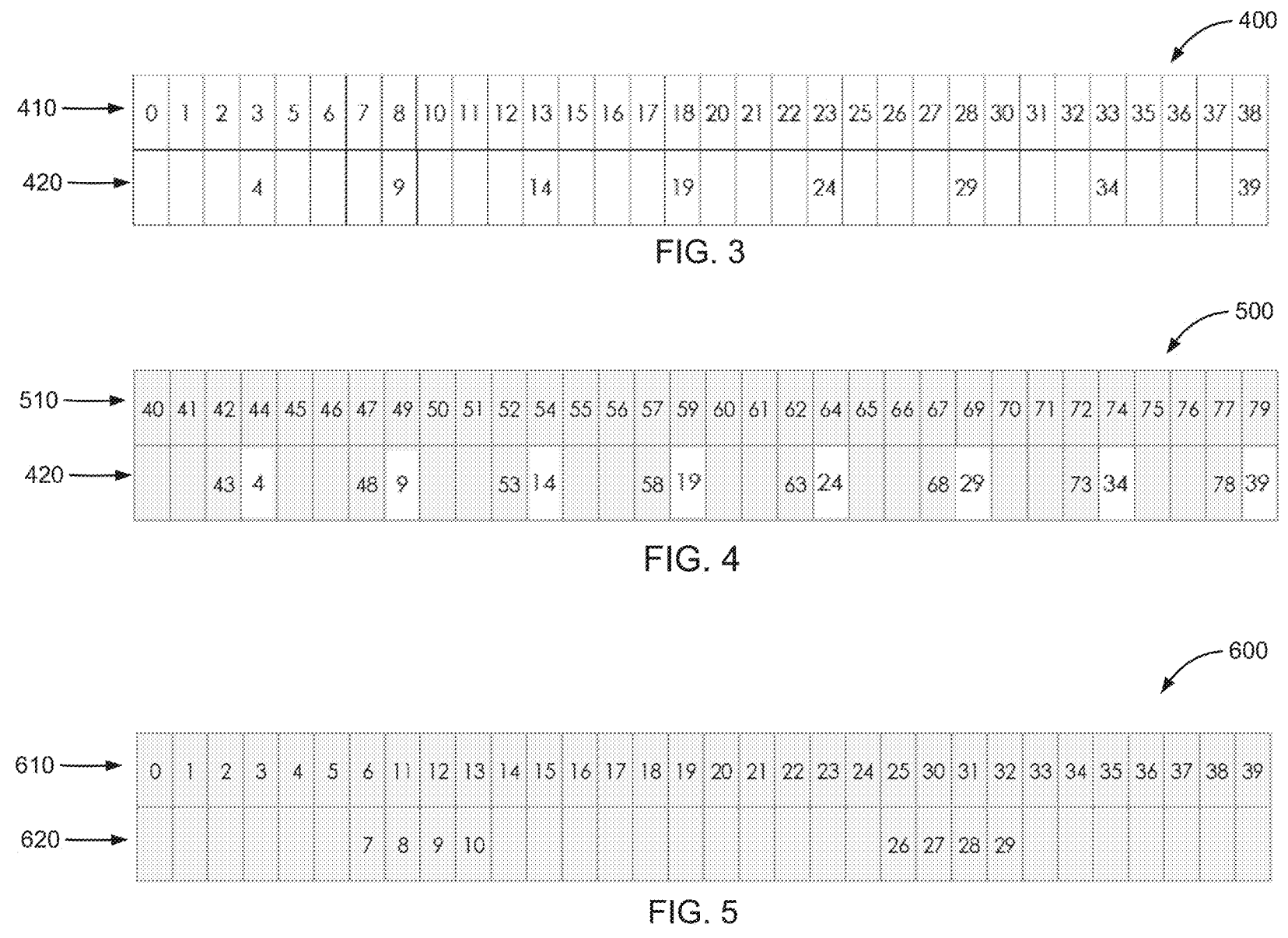

FIG. 3 depicts an FLT format logical sector layout 400 across a first primary physical track 410 and a first donor physical track 420, in a simplified form, as may be assigned by control circuitry 22 and implemented by disk drive 15, in accordance with aspects of the present disclosure. Donor physical track 420 may also be referred to as a secondary physical track 420. As shown, primary physical track 410 and donor physical track 420 each has 32 physical sectors, in this example. Control circuitry 22 assigns a proportion of sectors from donor or secondary physical track 420 together with the entirety of primary physical track 410 in a single logical track. In this example, control circuitry 22 assigns 25% of sectors (8 of 32) from donor track 420, or every fourth sector of donor track 420, in this example, to the logical track centered on primary physical track 410. The corresponding logical track is shown to have 40 logical sectors total (numbers 0-39 in FIG. 3 denotes the order of the sectors within the logical track). Since primary physical track 410 has 32 physical sectors as noted above, the logical track thus has 25% more sectors per track than primary physical track 410. As illustrated, the logical track starts with sectors 0-3 in primary physical track 410, then sector 4 from donor track 420 is interleaved into the sector order of the logical track. After sector 4, sectors 5-8 are from primary physical track 410, followed by sector 9 which is interleaved from donor track 420, and so on. As further explained below, primary physical track 410 may be on one disk surface (e.g., disk surface 17A) accessed by one head (e.g., head 18A) while donor track 420 may be on another disk surface (e.g., disk surface 17B or 17C) accessed by another head (e.g., head 18B or 18C). As such, access to both physical tracks 410 and 420 can be done concurrently to allow for real-time read or write of the logical track, including in examples with a conventional, single, fixed actuator arm assembly 19. In some single actuator arm assembly examples, disk drive 15 may use milliactuators, microactuators, and/or other fine actuators to facilitate maintaining alignment between both physical tracks 410 and 420 on different disk surfaces 17 across disks 16, including to compensate for any positioning variations between actuator arms 42 and heads 18.

FIG. 4 depicts another FLT format logical sector layout 500 across a second primary physical track 510 and the same donor physical track 420 as in FIG. 3, in a simplified form, as may be assigned by control circuitry 22 and implemented by disk drive 15, in accordance with aspects of the present disclosure. In this example, the numbering continues from FIG. 3, showing that logical track as encompassing the sectors from both FIG. 3 and FIG. 4. Control circuitry 22 assigns another proportion of sectors from donor physical track 420 together with the entirety of primary physical track 510 in another single logical track, the donor track 420 of which is thus shared with the logical track centered on physical track 410 of FIG. 3. In this example as well, control circuitry 22 assigns 25% of sectors from donor track 420, or every fourth sector of donor track 420, to the logical track centered on primary physical track 510, and the corresponding logical track thus has 25% more sectors per track than primary physical track 510. As illustrated, the logical track continues from FIG. 3 with sectors 40-42 in primary physical track 510, then sector 43 from donor track 420 is interleaved into the sector order of the logical track. After sector 43, sectors 44-47 are from primary physical track 510, followed by sector 48 which is interleaved from donor track 420, and so on. The lighter-shaded sector numbers in donor track 420 (4, 9, 14, 19, etc.) denotes the previously assigned sectors from the assignment scheme shown in FIG. 3. Here, again, tracks 510 and 420 can be accessed concurrently per the disk surface-head assignment scheme discussed above.

At this track radius, control circuitry 22 is assigning 25% of sectors of donor track 420 to be interleaved with a corresponding primary physical track. After the assignments of FIGS. 3 and 4, 50% of the sectors of donor track 420 have been assigned. Control circuitry 22 may also assign sectors of donor track 420 to two additional primary physical tracks, for four in total, and achieve full usage of donor track 420. In this example, 25% of donor track 420 is assigned to each of four primary physical tracks, adding up to 100% usage of donor track 420, with no remainder. At other disk radii, the sectors per physical track may not work out to assign proportions of a single donor track to proximate primary physical tracks with zero or negligible remainder, as in this example. In various examples, an FLT disk drive may allow a remainder of a donor track to go unused at a given time, though it may rotate usage of portions of the donor track as it overwrites logical tracks over time. In various examples, if control circuitry 22 detects that some donor tracks have unused remainders after usage of a single donor track with one or more primary physical tracks, control circuitry 22 may assign and bundle remainder portions of multiple donor tracks in a single logical track with a single primary physical track (or with multiple primary physical tracks, in many-to-many FLT implementations).

Primary track 410, primary track 510, and donor track 420 may all be at approximately the same track radius, in various examples. Donor track 420 may be at nearly the same or a substantially identical track radius to primary tracks 410 and 510 and on the opposing side of the same disk as primary tracks 410 and 510, in various examples. Donor track 420, primary tracks 410 and 510, and two other primary physical tracks associated with donor sectors of donor track 420, may all be proximate to each other, at a same or substantially the same track radius on one or both sides of a single disk or of multiple disks in a disk stack in disk drive 15, in various examples. Control circuitry 22 may implement techniques and processes to keep all primary physical tracks associated with a single donor track in logical tracks physically closely aligned with each other, and may control fine actuators such as milliactuators, microactuators, and/or other fine actuators to exercise fine control of the respective heads writing and reading those respective physical tracks on the respective disk surfaces, in various examples. Disk drive 15 may make use of one or more fine actuators per actuator arm and per head, for purposes of maintaining close physical alignment of primary and donor physical tracks logically assigned to one or more common logical tracks, and in close vertical alignment on either side of a disk 16, in various examples.

Control circuitry 22 and disk drive 15 may also alternate over time between heads, physical tracks, and disk surfaces for assigning to either primary physical track usage or donor physical track usage. For example, control circuitry 22 may at first assign a first disk surface 17A on a first side of a disk 16A and a first head 18A that corresponds with that first side of disk 16A for writing and reading primary physical track 410, and may correspondingly assign the opposing disk surface 17B on the opposing side of disk 16A, and second head 18B that corresponds with that opposing side of disk 16A, for writing and reading donor physical track 420. Then, at a later time, when either overwriting or refreshing the existing logical track, control circuitry 22 may write a primary physical track to disk surface 17B on the opposing side of disk 16A using head 18B, and for an associated donor track, logically bundled with that same primary physical track, may write the donor track to first disk surface 17A on the first side of disk 16A using first head 18A. Disk drive 15 may thus alternate back and forth over time between heads, tracks, and disk surfaces, for purposes that may illustratively include facilitating maintaining close physical alignment of the primary and donor physical tracks, and/or may include distributing "wear and tear" effects evenly over time, such as to include ameliorating long-term or medium-term or short-term physical effects of usage over time, such as thermal expansion or deformation of heads 18A and 18B.

FIG. 5 depicts another example FLT format logical sector layout 600 across a primary physical track 610 and a donor physical track 620, in a simplified form, as may be assigned by control circuitry 22 and implemented by disk drive 15, in accordance with aspects of the present disclosure. Whereas control circuitry 22 in the FLT implementation examples of FIGS. 4 and 5 assigns a single donor sector at a time for a corresponding portion of sectors (four consecutive primary sectors at a time in this example) on the primary physical track, control circuitry 22 in the FLT implementation example of FIG. 5 assigns a set of four consecutive donor sectors at a time for corresponding portions of varying sizes of primary track sectors on the primary physical track. In particular, in this example, control circuitry 22 assigns four consecutive sectors of donor track 620 as sectors 7 through 10 of the logical track, after assigning the first seven sectors of the primary physical track as the first seven sectors, (sectors 0 through 6) of the logical track; then assigns another fifteen sectors of the logical track to the primary physical track (sectors 11 through 25), then assigns another span of four consecutive donor track sectors to the logical track (sectors 26 through 29 of the logical track), then resumes assigning logical track sectors to the primary physical track.

This arrangement of assigning multiple consecutive logical track sectors to the donor track at a time may offer a different set of advantages, in the context of an overall constrained optimization among multiple overall performance criteria, than assigning a single logical track sector to the donor track at a time. Assigning multiple consecutive sectors to donor track 620 may reduce overall complexity and overhead, which may come with a tradeoff of a rotational offset between logical block addresses and channel buffering in transitioning between the donor track and the primary track, with transitions between logic blocks of the donor track and the primary track at a modestly greater spacing than in the example of FIGS. 4 and 5, in which the donor track sectors remain adjacent to their consecutive logical track sectors on the primary physical track. Disk drive 15 may use additional techniques such as 2× channel buffering for short periods to help address minimizing the rotational offset between the logical block addresses and channel buffering, in various examples.

Figure 6:
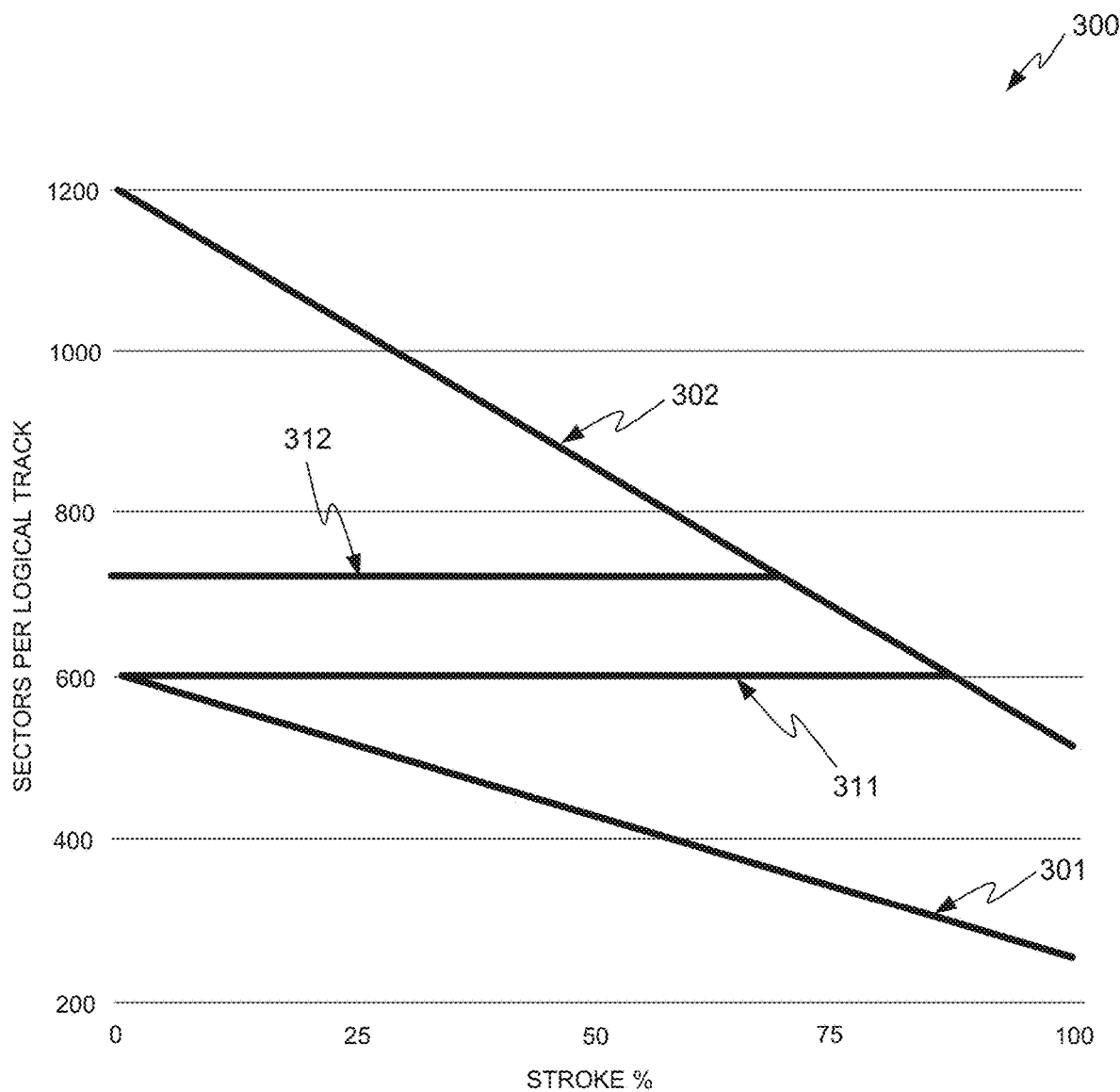
FIG. 6 illustrates comparative sectors per track of disk surfaces, across conventional, multiple integer band, and FLT disk drives, for otherwise comparable disk drives, with the understanding that on-track read data rates may be proportional to sectors per track, in accordance with aspects of the present disclosure.

FIG. 6 illustrates comparative sectors per track (physical or logical track as applicable), shown on the y-axis, from outer diameter to inner diameter (from left to right), shown across the x-axis, of disk surfaces 17, across conventional, multiple integer band, and FLT disk drives, for otherwise comparable disk drives, as shown in graph 300, with the understanding that on-track read data rates may be proportional to sectors per track, in accordance with aspects of the present disclosure. Track radius or disk position diameter also be referred to in terms of stroke, with stroke of 0 to 100% corresponding with diameter from outer diameter to inner diameter, as shown in the labeling along the x-axis. Line segment 301 shows sectors per track for a conventional disk drive. In this example, sectors per track go from approximately 600 at the outer diameter to approximately 260 at the inner diameter. In this conventional disk drive, the sectors per track refers to sectors per physical track, as there is no distinction between logical tracks and physical tracks. Line segment 302 shows sectors per track for a multiple integer band disk drive, and in particular with a 2× multiple integer band implementation, in which pairs of physical tracks are logically bundled together, such that each logical track comprises two physical tracks. In this example, sectors per track are simply double the sectors per track for the conventional disk drive as shown in line segment 301, and go from approximately 1,200 at the outer diameter to approximately 520 at the inner diameter.

Line segment 311 shows sectors per logical track for an example FLT disk drive of this disclosure, in a particular example referred to as 1×FLT, as explained below. As illustrated by line segment 311, the sectors per logical track in examples of 1×FLT are constant across most of the track radii, at an identical level with that at just the outer diameter in a conventional disk drive, as illustrated at the left edge of line segment 301. Close to the inner diameter, at a stroke of approximately around 85% or 90%, line segment 311 of 1×FLT intersects line segment 302 of 2× multiple integer band, which indicates a track radius at which the sectors per physical track is half that at the outer diameter, i.e., 300, and such that an entire donor track becomes associated with a primary track in an FLT logical track, and the distinction between the donor and primary tracks disappears. In this example of 1×FLT, there is also no usage of a third track to become a donor track to the two primary tracks at smaller track radii than at the intersection with 2× multiple integer band, so in the innermost and lowest 10% or 15% of track radii, 1×FLT logical track assignments coincide with and are equivalent with 2× multiple integer band logical track assignments.

Graph 300 also shows the sectors per logical track for another example FLT implementation referred to as 1.2× FLT, in line segment 312. As with the sectors per logical track for 1×FLT as shown in line segment 311, a 1.2×FLT disk drive, in various examples, has a constant number of sectors per logical track across a substantial proportion of track radii between the outer diameter and inner diameter of disks 16. This example is referred to as 1.2×FLT because it assigns a number of sectors per logical track equal to 1.2 times the maximum number of sectors per physical track, at the outer diameter. In this example in which the number of sectors per physical track at the outer diameter is 600, the 1.2×FLT disk drive assigns 720 sectors per logical track. At the outer diameter, the 1.2×FLT disk drive assigns 20% of a donor track to the outermost, longest full primary physical track, such that that logical track carries 120% of the bandwidth of that outermost, longest full primary physical track. Across the majority of the disk diameter in which the 1.2×FLT disk drive implements the constant sectors per track at 720, the 1.2×FLT disk drive assigns an ever higher proportion of a donor track beyond 20%, in proportional compensation to decreasing physical track radius, to each full primary physical track, such that each logical track carries 120% of the capacity of the physical capacity of the outermost physical track.

The rationale for this 1.2× implementation example is that the channel bandwidth or capacity may often be designed and implemented with an extra headroom margin of bandwidth, such as 20% extra bandwidth, beyond the nominal bandwidth or physical capacity of the outermost physical track, and thus of the nominal maximum data access bandwidth capacity of the disk drive, assuming a conventional (pre-FLT) track formatting. The value of 20% for extra capacity in this example, and the corresponding value of 1.2× for the FLT implementation, is an illustrative example, and other examples may include any feasible proportion or percentage of nominal extra channel margin. Various example FLT implementations in the family of examples that make use of nominal extra channel margin in pre-existing (or analogous later-developed) channel architecture and firmware may correspondingly implement logical tracks with any fractional multiple of the maximum physical outer track diameter capacity, and so may be implemented in examples of FLT technology with 1.1×, 1.3×, or 1.4× fractional multiples of outer diameter maximum physical track capacity, or any other feasible multiple within the ranges of 1× through 1.4× or any other feasible multiple higher than 1.4×, in various examples of FLT implementations, within the bounds of this disclosure.

As graph 300 shows, line segment 312 for a 1.2×FLT implementation intersects with line segment 302 for 2× multiple integer band, at a higher disk diameter and lesser stroke than for the values at which line segment 311 for a 1×FLT implementation intersects with line segment 302, as 1.2×FLT assigns an entire donor track to a primary track for the same logical track, saturating the donor track, and merges with 2× multiple integer band at a larger track radius than 1×FLT. In other examples, FLT control circuitry 22 may assign a third track as a donor track per logical track at inner track radii inward of where FLT uses two full primary physical tracks, in which case, the graph line segments analogous to line segments 311, 312 for sectors per logical track per track radius would continue horizontally rightward of line segment 302 for 2× multiple integer band.

Table 1 below shows data rate performance increases for FLT, for the particular examples of 1×FLT and 1.2×FLT, relative to conventional baseline without any distinction of logical tracks from physical tracks, and compared with for 2× multiple integer band (where multiple integer band achieves the data rate performance improvements while requiring additional channel architecture and firmware, which the FLT examples do not), for the examples of sequential reads, 2 MB random reads, and 2 MB super cache reads (the further examples of FLT super cache reads in accordance with aspects of this disclosure are explained below). As shown, the FLT examples enable substantial data rate performance improvements, across various data transfer scenarios, within the bounds of pre-existing single-channel SoC and firmware.

TABLE 1

| Configuration | Sequential | 2 MB Random | 2 MB Super Cache |
|---|---|---|---|
| 1× FLT | +29% | +12% to +18% | +20% |
| 1.2× FLT | +51% | +18% to +30% | +33% |
| 2× multiple integer band | +100% | +30 to +52% | +60% |

Figure 7:
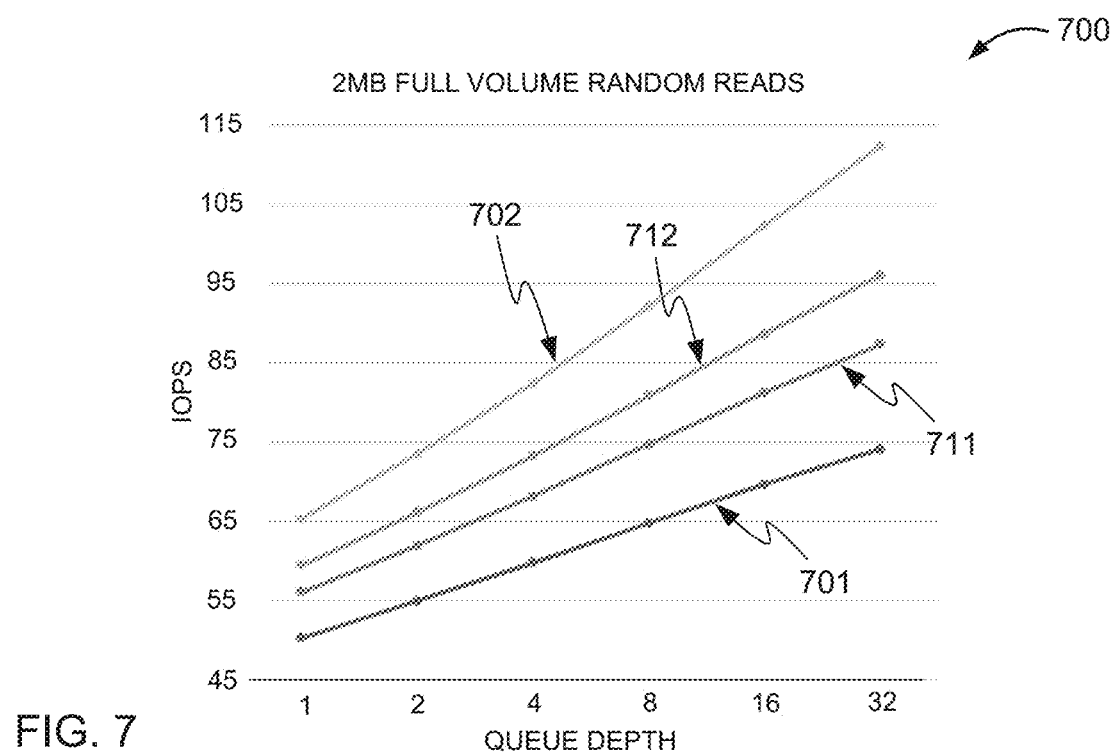
FIG. 7 depicts a graph of IOPS per queue depth for 1× and 1.2× example FLT disk drives relative to conventional single-track reads and 2× multiple integer band, for constant 2 MB full volume random reads, in accordance with aspects of this disclosure.
Figure 8:
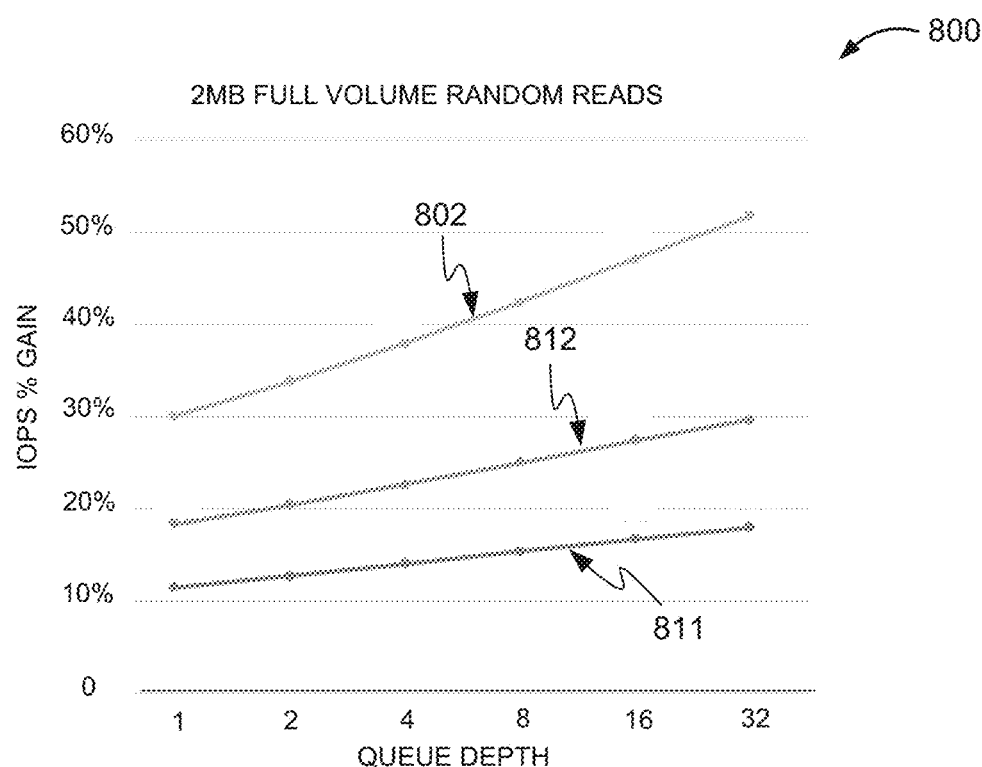
FIG. 8 depicts a graph of IOPS percentage gain per queue depth for 1× and 1.2× example FLT disk drives relative to conventional single-track reads and 2× multiple integer band, for constant 2 MB full volume random reads, in accordance with aspects of this disclosure.

FIG. 7 depicts graph 700 of IOPS per queue depth for 1× and 1.2× example FLT disk drives (curves 711 and 712, respectively) relative to conventional single-track reads and 2× multiple integer band (curves 701 and 702, respectively), for constant 2 MB full volume random reads, in accordance with aspects of this disclosure. FIG. 8 depicts graph 800 of IOPS percentage gain per queue depth for 1× and 1.2× example FLT disk drives (curves 811 and 812, respectively) relative to conventional single-track reads and 2× multiple integer band (the x-axis baseline and curve 802, respectively), for constant 2 MB full volume random reads, in accordance with aspects of this disclosure. IOPS and IOPS percentage gain are depicted along the y-axis of graphs 700 and 800, respectively, and queue depth is depicted along the x-axis in both of graphs 700, 800. As demonstrated, an FLT disk drive of this disclosure, in various examples, of which 1× and 1.2×FLT are illustrative, enable substantial IOPS performance gains over conventional single-band baseline, and with proportionally increasing IOPS performance gains for larger queue depth, which reduces the relative role of seek and latency relative to read transfer time in overall data rate.

Figure 9:
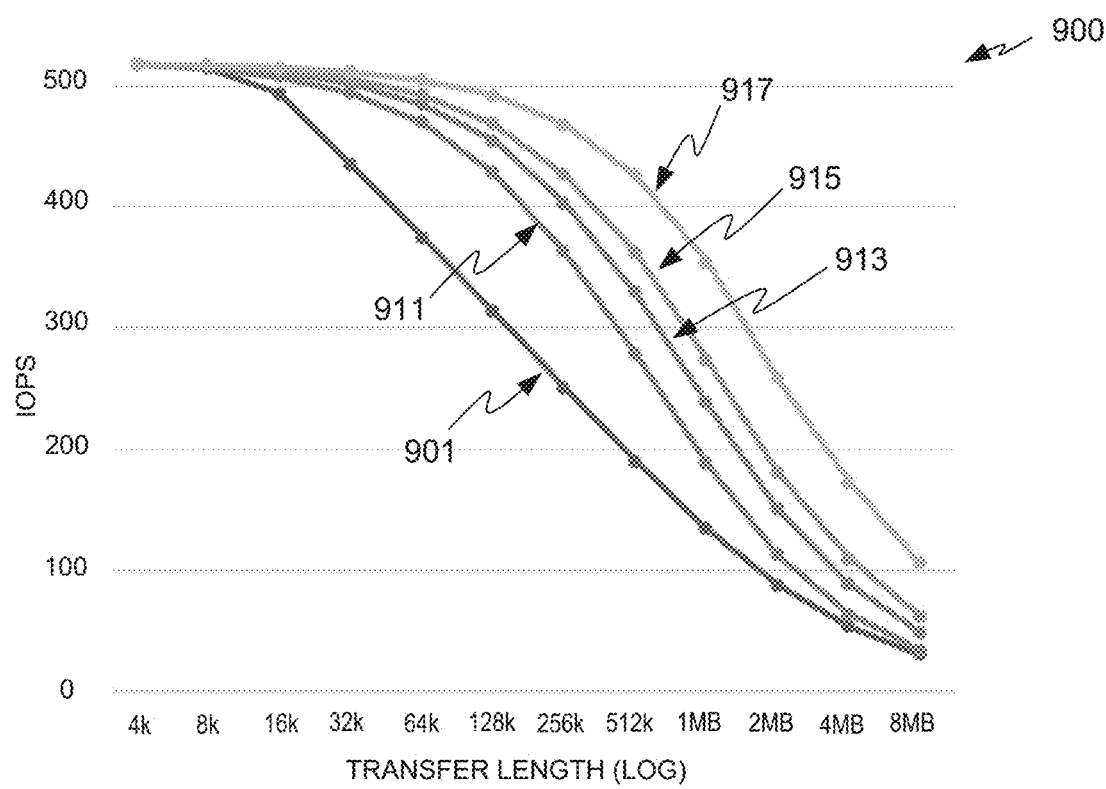
FIG. 9 depicts a graph of IOPS per read operation transfer length (on a logarithmic scale) for 1×, 1.5×, 2×, and 4× example FLT disk drives, in FLT examples in which disk drives incorporate super cache technology in combination with FLT technology of this disclosure, relative to conventional single-track reads, in accordance with aspects of this disclosure.
Figure 10:
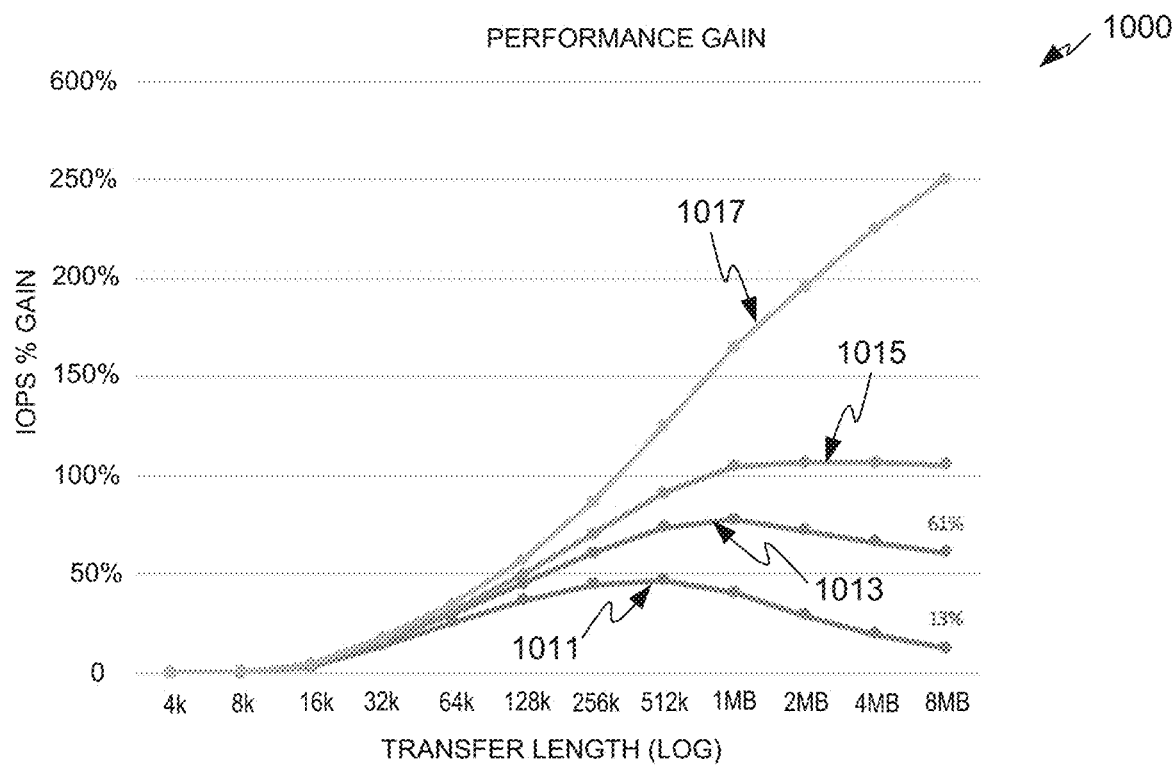
FIG. 10 depicts a graph of IOPS percentage gain per read operation transfer length (on a logarithmic scale) for 1×, 1.5×, 2×, and 4× example FLT disk drives, in FLT examples in which disk drives incorporate super cache technology in combination with FLT technology, and potentially also with multiple integer band technology, relative to conventional single-track reads, in accordance with aspects of this disclosure.

FIG. 9 depicts graph 900 of IOPS per read operation transfer length (on a logarithmic scale) for 1×, 1.5×, 2×, and 4× example FLT disk drives (curves 911, 913, 915, 917, respectively), in FLT examples in which disk drives incorporate super cache technology in combination with FLT technology of this disclosure, relative to conventional single-track reads (curve 901), in accordance with aspects of this disclosure. In some of these examples, disk drive 15 may also incorporate multiple integer band technology, together with FLT and super cache. FIG. 10 depicts graph 1000 of IOPS percentage gain per read operation transfer length (on a logarithmic scale) for 1×, 1.5×, 2×, and 4× example FLT disk drives (curves 1011, 1013, 1015, 1017, respectively), in FLT examples in which disk drives incorporate super cache technology in combination with FLT technology, and potentially also with multiple integer band technology, relative to conventional single-track reads (the x-axis baseline), in accordance with aspects of this disclosure. In super cache examples, disk drive 15 extends data access buffering to an internal embedded flash memory or any type of solid-state non-volatile memory component (which may have high endurance and low retention), and which may enable buffering and substantially increasing the internal queue depth in the embedded flash memory or any type of solid-state non-volatile memory component, beyond what might be possible in an otherwise analogous disk drive, and substantially reducing average seek and latency, such as by enabling storing a large number of write commands even with high transfer length. In other words, disk drive 15 may leverage an internal flash memory or any type of solid-state non-volatile memory component to convert or bundle numbers of relatively small data transfers ordered by host 44 into relatively long transfers with disk surfaces 17 for sequential operations that also use FLT technology of this disclosure, which may additionally be combined with multiple integer band technology. Thus, in various examples, an FLT disk drive 15 may also use super cache synergistically with FLT formatting to gain additional data rate performance advantages, synergistically combining novel advantages in all sources of overall data transfer time, including both seek and latency time and on-track data transfer time, in accordance with aspects of this disclosure.

In some examples, disk drive 15 may also make use of an internal flash memory or any type of solid-state non-volatile memory component as a donor for an FLT logical track format, to add extra headroom margin to an FLT logical track format, temporary or long-term, as an alternative or in combination with using a physical disk surface track as a donor track. In some of these examples, control circuitry 22 may reserve only a portion or up to a portion of an internal flash memory or any type of solid-state non-volatile memory component as virtual donor tracks, which disk drive 15 may use in any or all of the same ways it uses donor tracks as described and depicted herein. The term "donor track" may equivalently refer to a donor physical track on a disk surface or a virtual donor track in a flash memory or any type of solid-state non-volatile memory component, in accordance with aspects of this disclosure. Disk drive 15 may combine usage of donor physical tracks with physical virtual donor tracks in any combination, using either/or, or both in combination, at different times and/or at different disk surface radii or locations. As one illustrative example, disk drive 15 may implement a 1.4×FLT format in which, for all data assigned to a primary physical track, disk drive 15 also assigns 20% as much data to a disk surface donor track and 20% as much data to a donor track stored in a flash memory or other solid-state memory component within the hard drive.

Thus, control circuitry may assign and use at least a portion of sectors of either a donor physical track of the physical tracks, or sectors of a non-volatile memory storage, such as a flash memory or other solid-state memory component within the hard drive, or any other type of non-volatile memory storage or component, as a donor track, for any purposes as described herein in terms of comprising, using, and performing data access operations with a donor track, including in lieu of any assignment and use of a donor physical track, in various examples. Thus, such sectors of the non-volatile memory storage may form a virtual donor track, and be used as a donor track for all purposes and in all functions of a donor track as described herein (with exceptions to the description as appropriate for the different natures of a donor physical track on a disk surface and a virtual donor track of sectors in a non-volatile memory storage). In some examples, a respective logical track may be assigned to comprise both the portion of sectors of the donor physical track and the sectors of the non-volatile memory storage, as a single, integral, flexible donor track, in which the control circuitry may flexibly use and control both the donor physical track and the virtual donor track of the sectors of the non-volatile memory storage as a donor track for the logical track.

In some examples, as noted above, disk drive 15 may implement a many-to-many FLT logical track format, in which disk drive 15 logically bundles multiple primary physical tracks with multiple donor tracks into single logical tracks, across either a portion or the entirety of track radii between inner and outer diameters of disks 16, and using three or more heads for data access operations with three or more physical tracks (primary and donor) for a single logical track.

In various examples, an FLT disk drive of this disclosure may assign different format technologies to different portions of disks 16, such as different track radii of disks 16. As an illustrative example, a disk drive of this disclosure may assign an outermost or an innermost 10%, 20%, 30%, or whatever other proportion at whatever other positional range of disks 16, to be used with FLT formatting, or with FLT plus multiple integer band in combination, or with FLT plus super cache in combination, or with FLT plus multiple integer band and super cache in combination, and may other positional ranges to conventional single-band formatting and logical block addressing, or to multiple integer band and/or super cache without FLT.

In various examples, a disk drive of this disclosure comprises a split actuator that comprises and uses two vertically stacked, independent VCMs or other primary actuators and actuator arm assemblies, as described above, with FLT formatting, such that the disk drive may assign, control, and perform data access operations with a primary physical track via a first VCM and first actuator arm assembly, and with a donor track via a second VCM and second actuator arm assembly. In these examples, the control circuitry may assign and write a primary track and a donor track of a respective single logical track without regard to vertical alignment of the primary track and donor track across disk surfaces. Rather, the control circuitry may assign and write a primary track and a donor track of a respective single logical track at independent radial positions on different disk surfaces, without regard to vertical alignment. Thus, the first primary actuator and the second primary actuator are stacked in vertical alignment with each other, and the primary physical track and the donor physical track of the respective logical track are assigned at independent radial positions on a first disk accessed by the first actuator arm assembly and on a second disk accessed by the second actuator arm assembly. This may grant the disk drive an extra degree of freedom and further flexibility in arranging layouts of primary and donor physical tracks for flexible logical tracks.

In various examples, an FLT disk drive of this disclosure with multiple actuator arm assemblies may assign one or more selected portions of one or more disks in the disk drive, e.g., the outer 10% of the disks in one example, to be used primarily for long block random commands, with a 4× data rate, and interleaving one logical track among four physical tracks instead of two in this special region, with, e.g., three or two primary physical tracks and one or two donor physical tracks, using both of the two actuator arm assemblies in tandem to interleave the individual logic tracks among the four physical tracks at, e.g., a 4× data rate. In the other portions of the disks, the disk drive may operate the two or more actuator arm assemblies independently on different, independent workloads, each operating at, e.g., a 2× data rate. The disk drive may also modify the proportions of the disks designated for each data rate mode over time, in response to work demands. An FLT disk drive with one or multiple actuator arm assemblies may thus employ a flexible range of different combinations of data transfer technologies, in various examples.

In various examples, an FLT disk drive of this disclosure may have multiple primary actuators, each with its own actuator arm assembly and set of heads at different angular positions around the stack of disks, and potentially each with its own sets of milliactuators and/or microactuators and/or other fine actuators on the actuator arms and/or proximate to the heads, and may enable any of various usages of the heads of the multiple actuator arm assemblies in various implementations of FLT formatting. In various illustrative examples, an FLT disk drive of this disclosure may assign a first actuator arm assembly to implement one or more donor tracks to support primary physical tracks implemented by the other actuator arm assembly, or by both actuator arm assemblies.

An FLT disk drive of this disclosure may thus distribute data access operations per individual logical track across multiple actuator arm assemblies, and may interleave an individual logical track to disk surfaces by way of the multiple actuator arm assemblies. An FLT disk drive of this disclosure may implement a single logical track across multiple actuator arm assemblies either still in close vertical alignment on either side of on an individual disk, or otherwise proximate on an individual disk, or independently across disks in the disk drive, in different examples.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprises logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
one or more disks;
at least one actuator mechanism configured to position at least a first head proximate to a first disk surface among the one or more disks and a second head proximate to a second disk surface among the one or more disks; and
one or more processing devices configured, individually or in combination, to:
assign one or more logical tracks to physical tracks of two or more of the disk surfaces such that a respective logical track of the logical tracks comprises:
at least a portion of sectors of a primary physical track of the physical tracks, the primary physical track being on the first disk surface; and
at least a portion of sectors of a donor physical track of the physical tracks, the donor physical track being on the second disk surface; and
perform, using the first head proximate to the first disk surface and the second head proximate to the second disk surface, a data access operation with at least one of the logical tracks,
wherein at least a portion of the logical tracks is assigned with constant numbers of sectors per logical track, across a plurality of track radii on the first disk surface and the second disk surface.

2. The data storage device of claim 1, wherein the logical tracks are assigned to the physical tracks such that, for the respective logical track, the primary physical track and the donor physical track are in vertical alignment on opposing disk surfaces of one of the disks.

3. The data storage device of claim 1, wherein:
the actuator mechanism further comprises one or more fine actuators; and
the one or more processing devices are further configured, individually or in combination, to control the one or more fine actuators to maintain the vertical alignment of the primary physical track and the donor physical track on the opposing disk surfaces of the one of the disks.

4. The data storage device of claim 1, wherein:
the donor physical track is a first donor physical track; and
a second logical track is assigned to at least a second primary physical track and to the first donor physical track.

5. The data storage device of claim 1, wherein the one or more processing devices are further configured, individually or in combination, to:
buffer an internal queue depth for data access operations in a non-volatile memory storage.

6. The data storage device of claim 1, wherein:
the actuator mechanism further comprises a first actuator arm assembly comprising a first primary actuator and a second actuator arm assembly comprising a second primary actuator; and
the one or more processing devices are further configured, individually or in combination, to interleave the logical tracks via both the first actuator arm assembly and the second actuator arm assembly.

7. The data storage device of claim 6, wherein:
the first primary actuator and the second primary actuator are stacked in vertical alignment with each other;
the primary physical track of the respective logical track is assigned on a first disk accessed by the first actuator arm assembly; and
the donor physical track of the respective logical track is assigned on a second disk accessed by the second actuator arm assembly.

8. A data storage device, comprising:
one or more disks;
at least one actuator mechanism configured to position at least a first head proximate to a first disk surface among the one or more disks and a second head proximate to a second disk surface among the one or more disks; and
one or more processing devices configured, individually or in combination, to:

assign one or more logical tracks to physical tracks of two or more of the disk surfaces such that a respective logical track of the logical tracks comprises:
  at least a portion of sectors of a primary physical track of the physical tracks, the primary physical track being on the first disk surface; and
  at least a portion of sectors of a donor physical track of the physical tracks, the donor physical track being on the second disk surface; and
perform, using the first head proximate to the first disk surface and the second head proximate to the second disk surface, a data access operation with at least one of the logical tracks,
wherein at least a portion of the logical tracks is assigned with numbers of sectors per logical track equal to:
  a number of sectors of a highest radius physical track at an outer diameter of the disks, or
  a fractional multiple of a number of sectors of a highest radius physical track at an outer diameter of the disks.

9. A data storage device, comprising:
one or more disks;
at least one actuator mechanism configured to position at least a first head proximate to a first disk surface among the one or more disks and a second head proximate to a second disk surface among the one or more disks; and
one or more processing devices configured, individually or in combination to:
  assign one or more logical tracks to physical tracks of two or more of the disk surfaces such that a respective logical track of the logical tracks comprises:
    at least a portion of sectors of a primary physical track of the physical tracks, the primary physical track being on the first disk surface; and
    at least a portion of sectors of a donor physical track of the physical tracks, the donor physical track being on the second disk surface; and
  perform, using the first head proximate to the first disk surface and the second head proximate to the second disk surface, a data access operation with at least one of the logical tracks,
  wherein assigning the respective logical track to at least the respective primary physical track and at least the portion of sectors of the respective donor physical track comprises interleaving:
    a single sector from the donor track at a time between a plurality of consecutive sectors of the primary physical track in the respective logical track, or
    a consecutive plurality of sectors from the donor track at a time between a plurality of consecutive sectors of the primary physical track in the logical track.

10. A data storage device, comprising:
one or more disks;
at least one actuator mechanism configured to position at least a first head proximate to a first disk surface among the one or more disks and a second head proximate to a second disk surface among the one or more disks; and
one or more processing devices configured, individually or in combination, to:
  assign one or more logical tracks to physical tracks of two or more of the disk surfaces such that a respective logical track of the logical tracks comprises:
    at least a portion of sectors of a primary physical track of the physical tracks, the primary physical track being on the first disk surface; and
    at least a portion of sectors of a donor physical track of the physical tracks, the donor physical track being on the second disk surface; and
  perform, using the first head proximate to the first disk surface and the second head proximate to the second disk surface, a data access operation with at least one of the logical tracks,
  wherein the primary physical track is a first primary physical track, and
  wherein the respective logical track is further assigned such that the respective logical track further comprises sectors from at least:
    a second primary physical track or
    a second donor physical track.

11. The data storage device of claim 10, further comprising control circuitry configured to assign the logical tracks to the physical tracks of the disk surfaces such that the logical tracks across at least a portion of track radii of the disk surfaces are assigned with selected numbers of sectors per logical tracks, independent of numbers of sectors per the physical tracks.

12. The data storage device of claim 10, further comprising control circuitry configured to write and read the logical tracks to and from the disk surfaces such that each logical track corresponds with and is interleaved between one entire physical track, plus a fractional selection or proportion of sectors of a different donor physical track.

13. The data storage device of claim 10, further comprising control circuitry configured to interleave a continuously increasing proportion of donor physical track sectors with a primary track at decreasing track radii toward an inner diameter of the disks, as the sectors per primary physical track continuously decrease proportionally with declining radius.

14. The data storage device of claim 10, wherein the sectors per logical track are independent of a radius of the physical tracks and of numbers of sectors per physical track at each radius of the disks.

15. The data storage device of claim 10, further comprising a disk drive configured to implement an independently selected sector density per logical track and a selected data rate, maximized up to a maximum channel capability enabled for a maximum radius track of an outer diameter, and across a substantial portion of radii of the disk, while using only a single back-end channel encoder/decoder.

16. The data storage device of claim 15, wherein the disk drive is configured to allow a remainder of the donor physical track to go unused at a given time, and rotates usage of portions of the donor physical track as it overwrites logical tracks over time.

17. One or more processing devices comprising, individually or in combination:
  means for assigning one or more logical tracks to physical tracks of one or more disk surfaces such that a respective logical track of the logical tracks is assigned to comprise:
    at least a portion of sectors of at least a primary physical track; and
    at least a portion of sectors of at least a donor physical track of the physical tracks or sectors of a non-volatile memory storage; and
  means for performing a data access operation with at least one of the logical tracks,
  wherein the respective logical track is assigned to comprise both the portion of sectors of the donor physical track and the sectors of the non-volatile memory storage, and wherein the assigning comprises assigning with constant numbers of sectors per logical track, across the first disk surface and the second disk surface.

18. One or more processing devices comprising, individually or in combination:
   means for assigning one or more logical tracks to physical tracks of one or more disk surfaces such that a respective logical track of the logical tracks is assigned to comprise:
      at least a portion of sectors of at least a primary physical track; and
      at least a portion of sectors of at least a donor physical track of the physical tracks or sectors of a non-volatile memory storage; and
   means for performing a data access operation with at least one of the logical tracks, wherein:
   the means for assigning the logical tracks comprises means for assigning sectors of the donor physical track to the logical track; and
   the means for assigning the logical tracks to the physical tracks is such that, for the respective logical track, the primary physical track and the donor physical track are in vertical alignment on opposing disk surfaces of one of the disks.

* * * * *